Jan. 11, 1955 W. G. LIVEZEY ET AL 2,699,074
TRANSMISSION CONTROL SYSTEM
Filed June 21, 1950 4 Sheets-Sheet 4
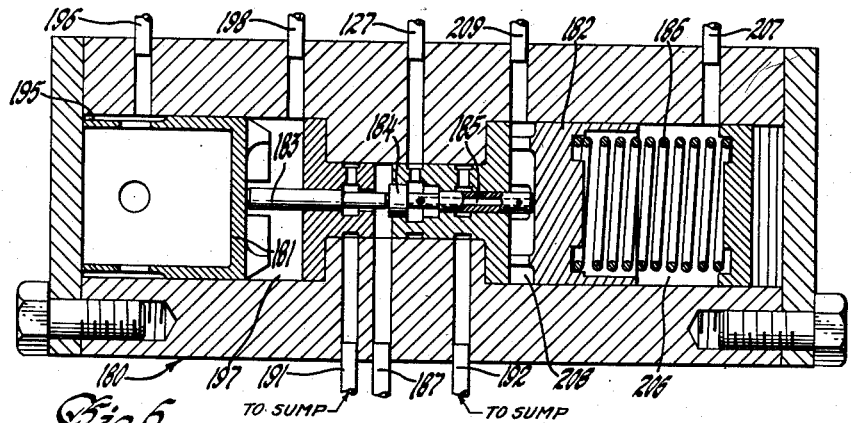
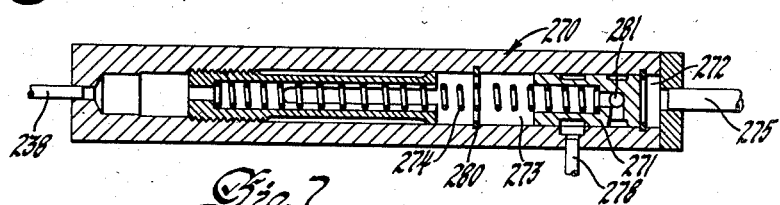
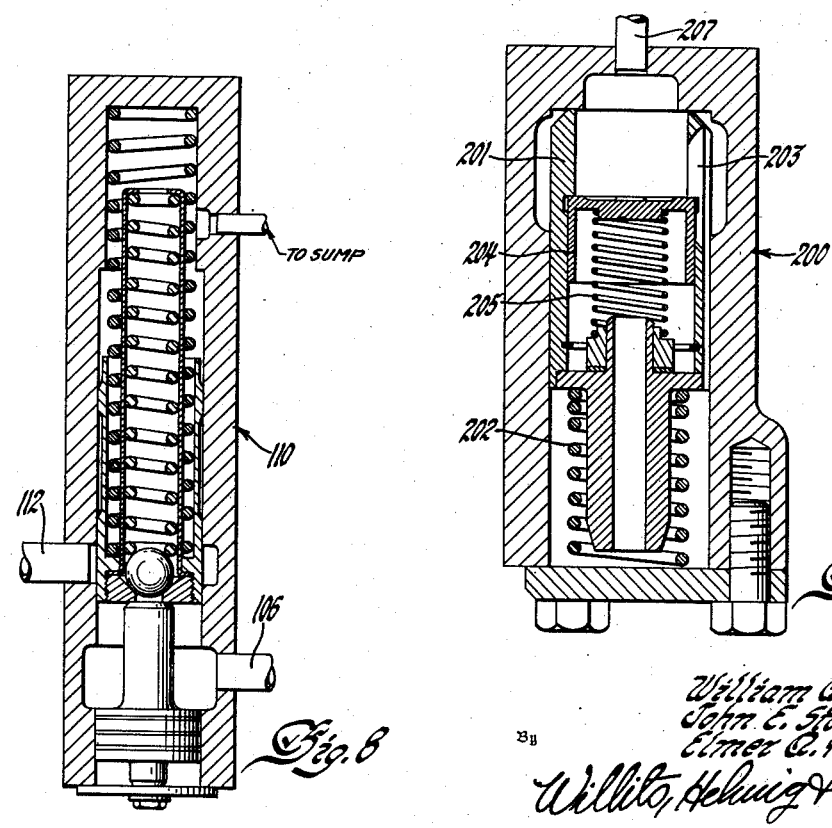
Inventors
William G. Livezey,
John E. Storer, Jr. &
Elmer A. Richards
By Willits, Helwig & Bailllo
Attorneys

United States Patent Office 2,699,074
Patented Jan. 11, 1955

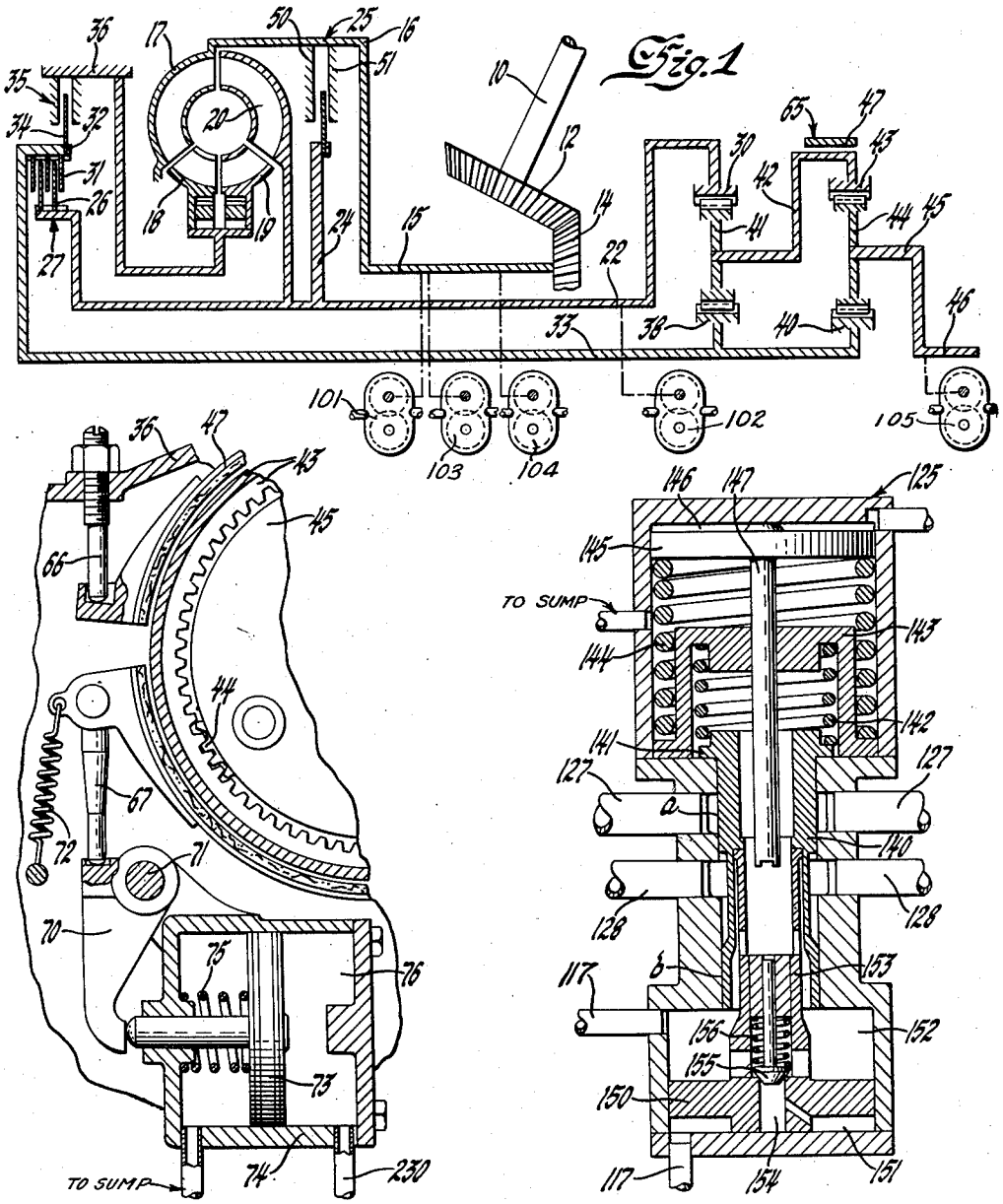

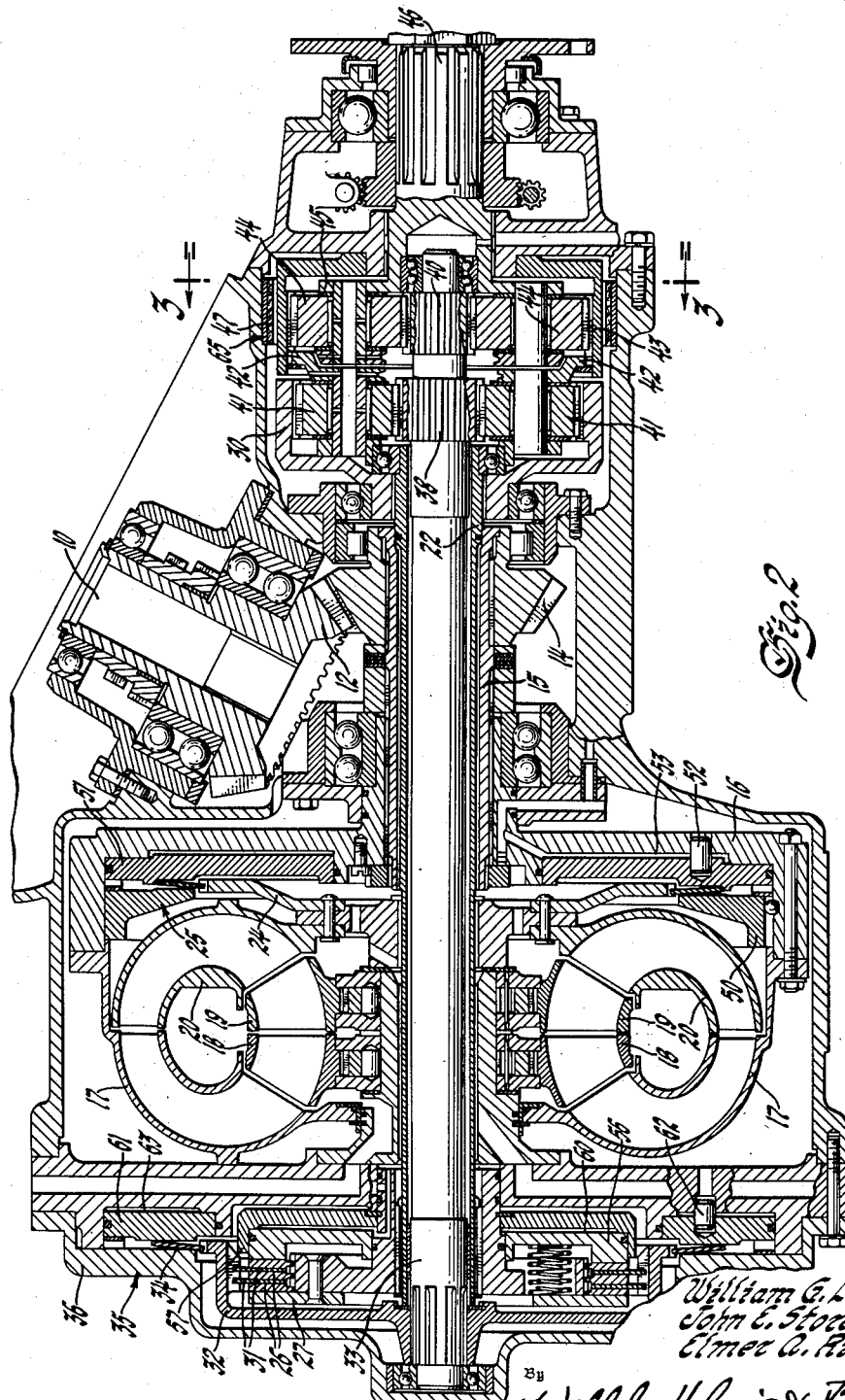

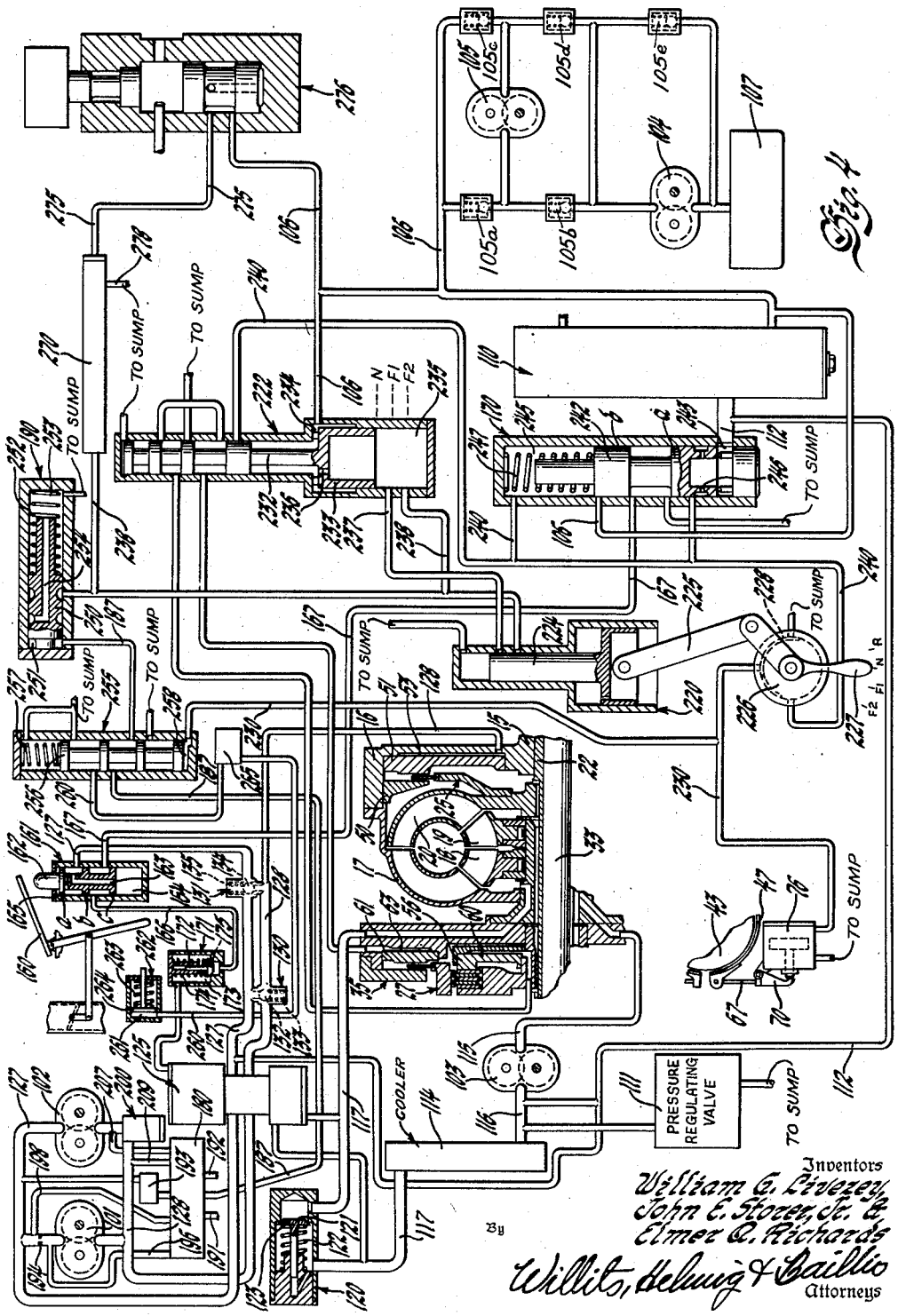

2,699,074

TRANSMISSION CONTROL SYSTEM

William G. Livezey, John E. Storer, Jr., and Elmer A. Richards, Indianapolis, Ind., assignors to General Motors Corporation, Detroit, Mich., a corporation of Delaware Application June 21, 1950, Serial No. 169,368

22 Claims. (Cl. 74—645)

Our invention relates to motor vehicles and particularly to a vehicle equipped with a transmission employing a hydraulic torque converter and incorporating improved transmission control means.

In some motor vehicles the engine is connected through a hydraulic torque converter to a transmission having change speed gears, while the torque converter has associated therewith a lock-up clutch effective when engaged to connect together the torque converter driving and driven elements.

When a vehicle is being accelerated it is desirable to have the power from the engine transmitted through the torque converter until the speed of the torque converter output or driven element reaches a predetermined proportion of the speed of the torque converter input or driving element and to then engage the lock-up clutch so that the engine is connected to the transmission independently of the torque converter.

In addition, when the vehicle is being driven through reduction gears in the transmission and the speed of the torque converter output member approaches the speed of the torque converter input member so that the lock-up clutch becomes engaged, it is desirable to shift the transmission so as to reduce the degree of gear reduction. It is also desirable when the transmission is shifted to provide a smaller gear reduction, to release the lock-up clutch and cause the power from the engine to be transmitted through the torque converter during the change in the transmission gears and thereafter until operating conditions are such that the speed of the torque converter output element approaches the speed of the torque converter input element. Under some driving conditions, as for example where an increase in torque is desired without shifting the transmission to a lower speed range, it is desirable for the operator to be able to manually disengage the lock-up clutch and keep it disengaged so that the engine power will be transmitted through the torque converter.

An object of our invention is to provide a transmission of the type described which incorporates means responsive to the relative speeds of the torque converter input and output elements for automatically engaging the lock-up clutch when the speed of the torque converter output element increases to a predetermined proportion of the speed of the torque converter input element.

A further object of the invention is to provide a transmission of the type described which incorporates means responsive to the relative speeds of the torque converter input and output elements for effecting shifting of the transmission gears to higher or more direct gear ratios to prevent the vehicle driving mechanism from being overstressed as a result of relatively high multiplication of the engine torque by the hydraulic torque converter.

Another object of the invention is to provide a transmission of the type described which incorporates means under the control of an operator for releasing the lock-up clutch after it has been engaged.

A further object of the invention is to provide a transmission of the type described which incorporates manually controlled means for changing the gear ratios therein and which includes means automatically operative on a change in the transmission gear ratios to release the lock-up clutch.

Another object of the invention is to provide a transmission of the type described and in which there is a first pump driven in accordance with the speed of the torque converter input element and a second pump driven in accordance with the speed of the torque converter output element, the discharge from the first pump being supplied through a first supply passage to the inlet of the second pump, and in which the pressure of the fluid in the first supply passage governs engagement of the lock-up clutch.

A further object of the invention is to provide a transmission of the type described and in which the discharge outlet of the second pump is connected through a second supply passage to the inlet of the first pump, and in which there is valve means subject to the opposing pressures of the fluid in the first and second supply passages for controlling changes in the speed ratios in the transmission.

Another object of the invention is to provide a transmission of the type described and in which there is a lock-up breaker valve effective when operated to release fluid from the first supply passage to thereby effect release of the lock-up clutch.

A further object of the invention is to provide a transmission of the types described and which includes means for operating the lock-up breaker valve whenever the vehicle accelerator pedal is fully depressed.

Another object of the invention is to provide a transmission of the type described and in which there is means operative automatically on a change in the transmission gear ratios to operate the lock-up breaker valve.

A further object of the invention is to provide a transmission of the type described which employs valve means responsive to the opposing pressures of the fluid in the first supply passage and of the fluid in the second supply passage for controlling gear changes in the transmission, and which has a lock-up breaker valve operated automatically to establish communication between the first and second supply pipes on a change in the gears of the transmission.

Another object of the invention is to provide a transmission of the type described which incorporates means effective automatically to release the lock-up clutch during operation of the engine in the low speed or idling range.

A further object of the invention is to provide an improved transmission of the type described which incorporates means for preventing manual shifting of the transmission gears to a lower speed range when the vehicle speed is so great that the momentum of the vehicle might cause to be transmitted through the transmission forces which might be of excessive magnitude and might drive the engine at an excessive speed.

Another object of the invention is to provide a transmission of the type described and in which the means for effecting release of the lock-up clutch during operation of the engine in the idling speed range permits the lock-up clutch to be engaged at engine speeds below the idling range so that the engine may be started by pushing or towing the vehicle.

A further object of the invention is to provide a transmission of the type described and incorporating means responsive to the relative speeds of the torque converter input and output elements for controlling the transmission gears.

Another object of the invention is to provide a transmission of the type described and incorporating means responsive to the relative speeds of the torque converter input and output elements for controlling the engine throttle.

A further object of the invention is to provide means effective when the speed of the torque converter output element is relatively low, and the speed of the torque converter input element is relatively high for limiting the torque applied to the vehicle driving means.

Other objects of the invention and features of novelty will be apparent from the following description taken in connection with the accompanying drawings.

In the drawings,

Fig. 1 is a schematic diagram of a transmission with which the control system of this invention is adapted to be employed;

Fig. 2 is a longitudinal sectional view of the transmission shown in Fig. 1;

Fig. 3 is a fragmentary view showing means for operating one of the pressure operated control devices of the transmission shown in Fig. 2;

Fig. 4 is a diagram of the transmission control system provided by this invention;

Fig. 5 is an enlarged sectional view of the lock-up breaker valve;

Fig. 6 is an enlarged sectional view of the torque limiting valve;

Fig. 7 is an enlarged sectional view of the inhibitor valve;

Fig. 8 is an enlarged sectional view of a pressure regulating valve; and

Fig. 9 is an enlarged sectional view of the variable orifice valve.

*Construction and operation of transmission*

Referring to Figs. 1 and 2 of the drawings, there is shown therein one form of transmission with which the control system provided by this invention is adapted to be employed. However, it is to be understood that the invention is not limited to use with this particular transmission but is adapted for use with transmissions of different design which provide a larger number of speed changes than are provided by transmission illustrated. The transmission shown in the drawings is shown and claimed in application Serial No. 132,388, filed December 10, 1949, by H. W. Christenson for Torque Converter Drive.

The transmission illustrated in the drawings includes a hydraulic torque converter, a compound planetary gear train, a lock-up clutch, and three additional pressure operated control devices. All of the pressure operated control devices are hydraulically operated and the supply of liquid under pressure to and the release of liquid under pressure from the chambers of the pressure operated control devices is governed by the control means shown in Fig. 4 of the drawings.

In Figs. 1 and 2 the engine driven shaft 10 has secured thereon a bevel gear 12 which meshes with the bevel gear 14 which is secured on the hollow shaft 15. The hollow shaft 15 has rigidly secured thereto the flywheel 16 to which is attached the pump or driving member 17 of the torque converter. The torque converter is a conventional four element device and includes stators 18 and 19. The torque converter also includes an output or driven element 20 which is secured on a hollow shaft 22 on which is also secured the driven member 24 of the lock-up clutch indicated generally by the reference numeral 25. In addition, the hollow shaft 22 has secured thereon the driving plates 26 of the pressure operated control device indicated generally by the reference numeral 27. The shaft 22 also has rigidly secured thereto the ring or orbit gear 30, while the driven plates 31 of the pressure operated control device 27 are mounted within a drum 32 secured on one end of the shaft 33 which is located within the hollow shaft 22. The drum 32 has mounted on its exterior the pressure operated control device disc 34 of the pressure operated control device which is indicated generally by the reference numeral 35 and provides means for at times locking the shaft 33 to the transmission housing 36.

The shaft 33 also has rigidly secured thereto the sun gears 38 and 40 of the planetary gear train. The planetary gear train includes a plurality of planet gears 41 which engage the sun gear 38 and the orbit gear 30. The planet gears 41 are mounted on a carrier 42 to which is secured the ring or orbit gear 43. The planetary gear train also includes a plurality of planet gears 44 which engage the ring gear 43 and the sun gear 40. The planet gears 44 are mounted on a carrier 45 to which is rigidly secured the transmission output shaft 46. The output shaft 46 is adapted to have secured thereto the propeller shaft, not shown, leading to the vehicle axle. The orbit gear 43 is surrounded by a band 47 which is adapted to be contracted about the exterior of the gear to prevent rotation of the gear.

The driven member 24 of the lock-up clutch 25 is located between a member which is rigidly secured relative to the flywheel 16, and the piston 51 which is mounted in a bore in the flywheel. The piston 51 is annular in form and is driven by the flywheel through a plurality of driving pins one of which is indicated at 52. The piston 51 is subject on one face to the pressure of the fluid in the chamber 53 and on an increase in the pressure of the fluid in this chamber the piston 51 presses the lock-up clutch driven member 24 against the member 50 to establish driving connection between the hollow shaft 15 and the hollow shaft 22 and thus lock out the torque converter. The piston 51 is also subject to the pressure of the fluid within the torque converter, but the pressure of the fluid supplied to the chamber 53 is substantially higher than that of the fluid within the torque converter so the piston is moved by the fluid supplied to the chamber 53.

The plates 26 and 31 of the pressure operated control device 27 are at times pressed together by a piston 56 which is mounted in an annular chamber in a member 57 mounted on the hollow shaft 22 and rotatable therewith. The piston 56 is subject to the pressure of the fluid in a chamber 60 between the piston and the member 57, and, on an increase in the pressure of the fluid in this chamber the piston 56 exerts force to press together the plates 26 and 31 of the pressure operated control device 27 and thus connect together the hollow shaft 22 and the shaft 33.

The disc 34 of the pressure operated control device 35 is at times clamped between a portion of the transmission housing 36 and a piston 61 which is mounted in an annular chamber in one section of the transmission housing 36. The piston 61 is secured against rotation relative to the transmission housing 36 by a plurality of pins 62, one of which is shown in Fig. 2 of the drawings. The piston 61 is subject to the pressure of the fluid in the chamber 63 between the piston 61 and the associated section of the transmission housing 36. On an increase in the pressure of the fluid in the chamber 63 the piston 61 exerts force to press the disc 34 against the transmission housing and thus secure the shaft 33 against rotation.

The band 47 is a part of a pressure operated control device indicated generally by the reference numeral 65, and is controlled by means illustrated in Fig. 3 of the drawings. Referring to Fig. 3 of the drawings it will be seen that one end of the band 47 is anchored to the housing 36 by a pin 66, while the other end of the band 47 has secured thereto a link 67 the end of which rests in a socket in a lever 70 which is pivotally supported from the housing 36 by a shaft 71. The band 47 is urged to the released position by a coil spring 72 and is moved against the spring by force exerted through the lever 70 by the piston 73 which is mounted in a cylinder 74 associated with the transmission housing. The piston 73 is urged to the released position by a coil spring 75 and is moved against this spring on an increase in the pressure of the fluid in the chamber 76. On this movement of the piston 73 the band 47 is contacted about the ring gear 43 and prevents rotation of the ring gear.

When all of the pressure operated control devices are released the transmission is in neutral and no torque is transmitted from the engine to the output shaft 46. At this time the pressure operated control devices 27 and 35 are released so the shaft 33 is free to rotate. Similarly, the lock-up clutch 25 is disengaged so the shaft 22 is not driven through the lock-up clutch, while it is assumed that the engine is operating at the idling speed so that substantially no torque is transmitted to the shaft 22 through the torque converter.

When the pressure operated control device 35 is engaged as hereinafter explained, the shaft 33 is prevented from rotating. If the engine speed is now increased so that substantial torque is transmitted through the torque converter to the shaft 22 the ring gear 30 will cause the planet gears 41 to revolve about the sun gear 38, thus rotating the carrier 42 and the ring gear 43. Hence, the ring gear 43 will cause the planet gears 44 to revolve about the sun gear 40, thereby rotating the carrier 45 and the output shaft 46 so that the vehicle is driven. At this time there is a reduction in speed and an increase in torque in the torque converter and also in the planetary gear train so the output shaft operates at a slow speed and this may be considered to be the lowest forward speed of the transmission.

On subsequent engagement of the lock-up clutch 25, the shaft 22 is driven directly from the shaft 15 so the speed reduction and torque increase in the torque converter is eliminated, but the speed reduction and torque increase in the planetary gear train remains. Hence, the output shaft 46 is driven at a more rapid rate and this may be considered to be the second speed of the transmission.

As the speed of the vehicle increases, the lock-up clutch 25 and the pressure operated control device 35 may be released and the pressure operated control device 27 may be engaged. Release of pressure operated control device 35 permits the shaft 33 to turn, while engagement of pressure operated control device 27 couples shaft 33 to the shaft 22 and thus to the output element 20 of the torque converter so that the shaft 22 and 33 rotate in the same direction and at the same speed. Hence, the ring gear 30 and the sun gear 38 cause the planet gears 41 and the carrier 42 to rotate with the shafts 22 and 33, and the carrier 42 turns the ring gear 43 so that the ring gear 43 and the sun gear 40 cause the planet gears 44, the carrier 45, and the output shaft 46 to rotate with the shafts 22 and 33. Accordingly, the speed reduction and torque increase in the planetary gear train are eliminated, but as the lock-up clutch 25 is assumed to be released, a torque increase and speed reduction in the torque converter does occur. The various parts of the transmission are arranged and proportioned so that the speed reduction in the planetary gear train is larger than that which normally occurs in the torque converter so that when the torque converter is functioning and the planetary gear train is locked out, the transmission may be considered to be in its third speed.

On subsequent engagement of the lock-up clutch 25 while the pressure operated control device 27 remains engaged, both the torque converter and the planetary gear train are locked out and the output shaft 46 is driven directly from the engine. This is the fourth or direct drive speed of the transmission.

From the foregoing it will be seen that when the pressure operated control device 27 is released and the pressure operated control device 35 is engaged, there is a speed reduction through the transmission planetary gear train, while there may be a further speed reduction through the torque converter depending on whether the lock-up clutch 25 is engaged or released. Similarly, when the pressure operated control device 27 is engaged and the pressure operated control device 35 is released, the transmission planetary gear train is locked out, but there may be a speed reduction through the torque converter depending on whether the lock-up clutch 25 is engaged or released. When the transmission is controlled so that there is a speed reduction through the planetary gear train, the transmission may be considered to be in its first forward range, and when the transmission is controlled so that the planetary gear train is locked out, the transmission may be considered to be in its second forward range.

When the pressure operated control devices 25, 27 and 35 are released and the pressure operated control device 65 is engaged, the transmission is in reverse. When the pressure operated control device 65 is engaged the ring gear 43 and the carrier 42 are prevented from rotating. If the engine speed is now increased so that torque is transmitted from the engine through the torque converter to the shaft 22, the ring gear 30 will drive the planet gears 41 and thus drive the sun gear 38 in the direction opposite to that in which the ring gear 30 is turning. On this rotation of the sun gear 38 the shaft 33 and the sun gear 40 also rotate and the sun gear 40 drives the planet gears 44, the carrier 45 and the output shaft 46 in the same direction that the shaft 33 is turning, that is in the direction opposite to the shaft 15.

*Construction and operation of elements of control system*

Referring to Fig. 4 of the drawings, the control system provided by this invention employs five pumps which are designated 101, 102, 103, 104 and 105 in the drawings. These pumps are preferably gear type pumps of conventional construction and each has a housing providing a chamber within which are mounted a pair of meshing gears.

The pumps 101, 103 and 104 are driven from the hollow shaft 15 by suitable means, not shown, so that each of these pumps operates at a speed directly proportional to the speed of the engine. The pump 102 is driven from the hollow shaft 22 by suitable means, not shown, so that the pump 102 operates at a speed directly proportional to the speed of the torque converter output or driven member 20. The pump 105 is driven from the transmission output shaft 46 by suitable means, not shown, so that the pump 105 operates whenever the vehicle is in motion. As the output shaft 46 may turn in one direction at one time and in the other direction at other times, the gears of the pump 105 may be driven in different directions at different times, and the pump 105 has associated therewith suitable check valves 105a, 105b, 105c and 105d which operate to insure that the pump 105 always supplies liquid to a supply passage 106 regardless of the direction of rotation of the pump gears. The pump 104 is connected in series with the pump 105 so that when both pumps operate, the pump 104 supplies liquid to the pump 105 and little power is required to drive the pump 105, as explained in application Serial No. 168,681, filed June 17, 1950, Wm. G. Livezey. A passage extending around the pump 104 has a check valve 105e therein to permit the pump 105 to draw liquid from the sump 107 when the pump 104 is idle, while the check valves associated with the pump 105 permit the pump 104 to supply liquid to the supply passage 106 when the pump 105 is idle.

The engine driven pump 101 and the converter output shaft driven pump 102 and the driving means therefore are arranged and proportioned so that the volume of liquid pumped by the pump 102 is substantially equal to that pumped by the pump 101 when the speed of the torque converter output member 20 is approximately 80% of the speed of the torque converter input member 17. As stated above, the pump 101 is driven from the shaft 15 associated with the converter input member 17 so the speed of the pump 101 varies in accordance with the speed of the converter input member 17.

The chamber in the torque converter is normally charged with lubricant under pressure supplied from the supply passage 106 through the valve 110 and a pipe 112. The valve 110 is a pressure regulating valve and operates to permit liquid to flow from passage 106 to the passage 112 when and only when the liquid in the passage 106 is at a predetermined relatively high value such as 100 pounds to the square inch. This pressure is high enough to insure proper operation of the equipment operated by liquid under pressure supplied from the passage 106.

The pressure of the liquid in the torque converter circulating system is controlled by a pressure regulating valve 111 which communicates with the pipe leading to the inlet of the pump 103. The pipe 112 also communicates with this pipe so the valve 111 serves to regulate the pressure of the liquid in the pipe 112 and connecting passages.

The liquid in the torque converter is constantly recirculated through a cooler 114 by the pump 103. The outlet of the pump 103 is connected to the interior of the torque converter by the pipe 115 and suitable connecting passages in the transmission housing and in the torque converter, while the inlet of the pump 103 is connected by pipe 116 with the outlet of the cooler 114. Lubricant is supplied from the chamber of the torque converter through suitable connecting passages to the pipe 117 leading to the inlet of the cooler 114. The flow of lubricant through the pipe 117 to the cooler is governed by the converter orifice valve 120 which comprises a valve element 121 which is urged to the seated position by a spring 122. The valve element 121 has an orifice 123 extending therethrough.

The pressure of the fluid in the torque converter chamber and associated passages is governed in part by the pressure of the lubricant supplied through the pipe 112. The difference in the pressure of the fluid on opposite sides of the valve element 121, that is the difference in the pressure of the fluid in the pipe 117 leading from the torque converter and of the fluid in the cooler 114 and in the pipe 116 is governed by the rate of operation of the pump 103 which is driven from the shaft 15 and therefore operates at a rate varying in accordance with the rate of operation of the vehicle engine. The valve element 121 is held seated by the spring 122 until the pressure of the fluid on opposite sides of the valve element builds up to a predetermined value which is present when and only when the pump 103 operates at the rate at which it is driven when the engine operates at a speed above its idling range, as for example when the engine operates at a speed in excess of 800 R. P. M. The orifice 123 permits restricted circulation of lubricant in the torque converter circulating system when the valve element 121 is seated.

This transmission control system includes means for governing the engagement and release of the lock-up clutch and also includes means for governing the engagement and release of the other pressure operated control devices of the transmission.

The means for governing engagement and release of the lock-up clutch 25 comprises the pumps 101 and 102 and the lock-up breaker valve 125. As previously stated the pump 101 is driven from the shaft 15 so that it operates in accordance with the rate of operation of the torque converter input element 17, while the pump 102 is driven from the shaft 22 and therefore is driven in accordance with the rate of operation of the torque converter output element 20.

The outlet of the pump 101 is connected by the first control passage 127 with the inlet of the pump 102, while the outlet of the pump 102 is connected by the second control passage 128 with the inlet of the pump 101. As previously explained the pumps 101 and 102 are proportioned so that the capacity of the pump 102 is substantially equal to that of pump 101 when the speed of the torque converter output member 20 is substantially 80% or more of the speed of the torque converter input element 17. Accordingly, when the torque converter output element operates at a speed which is 80% or more of the speed of the torque converter input element the pump 102 will supply liquid to the passage 128 more rapidly than liquid is taken from this passage by the pump 101 and there will be an increase in the pressure of the fluid in the passage 128. When the pump 102 is operating at a slower speed it will not supply liquid to the passage 128 as fast as liquid is taken from this passage by the pump 101 and there will be a reduction in the pressure of the fluid in the passage 128.

Lubricant is supplied to the control passages 127 and 128 through a branch of the pipe 112 so the passages 127 and 128 are normally charged with fluid at the pressure supplied through the pipe 112. The torque converter is also charged with fluid supplied from the pipe 112. A branch of the second control passage 128 is connected to the chamber 53 of the lock-up clutch 25 so the piston 51 of the lock-up clutch 25 normally has fluid at substantially equal pressures on opposite sides thereof.

The difference in the pressure of the fluid in the control passages 127 and 128 is limited by valves 130 and 131. The valve 130 comprises a valve element 132 subject to the opposing pressures of the fluid in the passages 127 and 128 and controlling the flow of fluid from the passage 127 to the passage 128. The valve element 132 is urged to the seated position by a spring 133 and is moved against the spring when the pressure of the fluid in the passage 127 exceeds that of the fluid in the passage 128 by a small amount, such as 10 pounds to the square inch. Similarly, the valve 131 comprises a valve element 134 which is subject to the opposing pressures of the fluid in the passages 127 and 128 and is urged to the seated position by a spring 135 which is proportioned to hold the valve element in the closed position until the pressure of the fluid in the passage 128 exceeds that of the fluid in the passage 127 by a substantial amount, such as 90 pounds to the square inch. This permits the pressure of the fluid in the passage 128, and in the chamber 53 of the lock-up clutch 25, to exceed the pressure of the fluid in the torque converter by an amount sufficient to insure proper operation of said lock-up clutch and at the same time prevents damage to said lock-up clutch.

Under conditions of low vehicle speed and substantial load the speed of the torque converter ouput element 20 relative to the input element 17 is such that the pump 102 has less capacity than the pump 101 and the fluid in the passage 128, and in the connected chamber 53 of the lock-up clutch 25, is maintained at a low value which is not greater than, and may be less than the pressure of the fluid in the torque converter. Hence, the piston 51 of the lock-up clutch 25 does not exert force on the clutch member 24 and the lock-up clutch is disengaged.

When driving conditions change so that the speed of the torque converter output element 20 increases to 80% or more of the speed of the input element 17, the capacity of the pump 102 exceeds that of the pump 101 and there is an increase in the pressure of the fluid in the passage 128 and in the connected chamber 53 of the lock-up clutch 25. Hence, the piston 51 exerts force to engage the lock-up clutch 25, thereby causing the clutch member 24 to be driven with the result that the speed of the torque converter output element 20 increases relative to the speed of the input element. This produces an increase in the capacity of pump 102 relative to pump 101 so there is an increase in the pressure of the fluid in passage 128 and in the chamber 53, thereby increasing the degree of engagement of the lock-up clutch 25. This cycle continues until the lock-up clutch is fully engaged, at which time the pump 102 is driven at the same rate as the pump 101 so the capacity of the pump 102 substantially exceeds the capacity of the pump 101 and the pressure in the passage 128 is maintained at a value which insures engagement of the lock-up clutch. The operation of the equipment is such, therefore, that once engagement of the lock-up clutch 25 is initiated it is certain to be completed.

After the lock-up clutch 25 is engaged the pumps 101 and 102 are certain to be driven at rates which will maintain said lock-up clutch 25 in engagement, and the lock-up breaker valve 125 is provided to release the lock-up clutch 25 after it has become engaged.

The construction of the lock-up breaker valve 125 is shown in detail in Fig. 5 of the drawings where it will be seen that there is a body having a bore therein which is surrounded by spaced grooves to which the passages 127 and 128 are connected. A movable valve element 140 is slidably mounted in this bore and has intermediate its ends a portion of reduced diameter which has at one side a land *a* and at the other side a land *b*. The upper end of the element 140 has thereon a flange 141 which engages the valve body to limit downward movement of the valve element by the coil spring 142 which extends between the valve element and a cage 143. The cage 143 is held in place by a spring 144 which extends between the cage and a piston 145 mounted in a bore in the body of the valve device. The spring 144 normally holds the piston 145 against the cover of the bore, while the piston 145 is moved against the spring 144 on an increase in the pressure of fluid in the chamber 146 at the face of the piston. Movement of the piston 145 against the spring 144 is limited by engagement of the piston with the cage 143. The piston 145 has secured thereto a stem 147 which projects within the tubular valve element 140.

The lock-up breaker valve 125 also includes a piston 150 which is mounted in a bore in the body of the valve device and is subject to the opposing pressure of the fluid in a chamber 151 which is open to the pipe 117 on the upstream or pressure side of the converter orifice valve 120, and of the fluid in a chamber 152 which is open to the pipe 117 on the downstream or discharge side of the converter orifice valve 120. The piston 150 has secured thereto a stem 153 which extends within the tubular valve element 140 and engages an internal shoulder on the valve element. The piston 150 has a centrally located passage 154 controlled by a valve element 155 which is urged to the seated position by a coil spring 156.

Under normal conditions the various parts of the valve device 125 occupy the positions in which they are shown in Fig. 5 of the drawings. At this time the valve element 140 is in a position in which the land *a* blocks the groove to which passage 127 is connected and thus prevents flow of fluid between the passages 127 and 128.

The operation of the lock-up clutch breaker valve 125 is such as to permit the lock-up clutch 25 to be engaged at engine speeds below the engine idling speed range, that is below 400 R. P. M., and at engine speeds above the idling range, that is above 800 R. P. M., and to cause the lock-up clutch to be disengaged when the engine is operating in its idling range, that is at engine speeds between 400 and 800 R. P. M.

As previously mentioned, the difference in the pressure of the fluid in the passage 117 on opposite sides of the converter orifice valve 120 varies with variations in the rate of operation of pump 103 which is driven in accordance with the rate of operation of the engine. This pressure difference is also affected by the orifice valve 120, while the piston 150 is subject to the opposing pressures of the fluid in the chambers 151 and 152 which are connected to the portions of passage 117 on opposite sides of the orifice valve 120. The various parts of the equipment are arranged and proportioned so that at engine speeds below 400 R. P. M, the pressure of the fluid in the chamber 151 exceeds that of the fluid in the chamber 152 by a small amount so the piston 150 does not move the valve element 140, or moves the valve element 140 against the spring 142 a small amount which is insufficient to cause the land *a* to uncover the groove associated with passage 127. Hence, the valve 125 will not cause the lock-up clutch 25 to be released at extremely low engine speeds. This is desirable as it permits engagement of the lock-up clutch 25 when the engine is being started by pushing or towing the vehicle. When the vehicle is being pushed or towed with the engine idle, the pump 102 is driven, while the pump 101 remains idle. Under these conditions there is an increase in the pressure of the liquid in the passage 128 and in the chamber 53 of the lock-up clutch 25 so the lock-up clutch is engaged.

As the engine speed increases to a value in the engine idling speed range, the difference in pressure in the chambers 151 and 152 increases and the piston 150 moves the valve element 140 against the spring 142 far enough for the land *a* to uncover the groove associated with passage 127 and thus connect passages 127 and 128 together through the area of reduced diameter on the valve element 140. When the passages 127 and 128 are thus connected together the pressure of the fluid in the passage 128, and thus in the lock-up clutch chamber 53, is reduced to the pressure present in passage 127 which is substantially the same as that present in the torque converter. Hence, the lock-up clutch 25 is certain to be disengaged.

On an increase in the speed of the engine to a speed above the idling range, that is above 800 R. P. M., the pressure of the fluid in the chamber 151 exceeds that of the fluid in the chamber 152 by an amount sufficient to cause the piston 150 to move the valve element 140 against the spring 142 far enough to cause land *b* to block the groove associated with passage 128 and thus cut off flow of fluid between the passages 127 and 128. The upward movement of the valve element 140 is limited by engagement of the valve element with the cage 143. After valve element 140 cuts off flow of fluid between the passages 127 nad 128, the lock-up clutch 25 may be engaged if conditions are otherwise proper. Since the valve device 125 operates to normally cut off flow of fluid between the passages 127 and 128 at engine speed above the idling range it follows that at such times the lock-up clutch 25 will be engaged or disengaged according to the speed of the pumps 101 and 102, and according to operation of other portions of the control system.

The lock-up clutch breaker valve 125 also includes means for releasing the lock-up clutch 25 after this clutch has been engaged. On the supply of fluid under pressure to the chamber 146 the piston 145 is moved against the spring 144 and the stem 147 engages the stem of the piston 150 to move the piston 150 downwardly and thus permit the spring 142 to move the valve element 140 downwardly. Downward movement of the piston 145 is limited by engagement of the piston with the spring cage 143, while the various parts of the valve device are proportioned so that when the piston 145 engages the cage 143, the piston 150 is moved to a position to permit the spring 142 to move the valve element 140 to the position in which communication is established between passages 127 and 128.

It will be seen that the piston 145 is effective to move the valve element 140 to the position to cause release of the lock-up clutch only when the valve element 140 is in the position to which the valve element is moved when the piston 150 shows that the vehicle engine is operating at a speed above the idling range. This arrangement prevents operation of the lock-up breaker valve to release the lock-up clutch when the engine speed is below the idling range, as for example when the vehicle is being pushed or towed to start the vehicle engine.

When the piston 150 is moved downwardly by force exerted by the piston 145, the fluid in the chamber 151 may escape to chamber 152 by unseating the valve 155. This permits the piston 150 to move rapidly.

On subsequent release of the fluid under pressure in the chamber 146, the piston 145 is returned to its upper position by the spring 144 so the piston 150 is free to control the valve element 140 in accordance with the pressure of the fluid in the chambers 151 and 152.

This control system includes means under the control of the vehicle operator for supplying fluid under pressure to the chamber 146 of the lock-up breaker valve 125, and includes other means automatically operative on engagement of one of the transmission clutches for supplying fluid to the chamber 146.

As clearly shown in Fig. 4 of the drawings, the accelerator pedal 160 of the vehicle has associated therewith a control valve indicated generally by the reference numeral 161 and comprising a body having a bore therein in which is mounted a valve element 162 which has spaced lands *a*, *b* and *c*. A drilled passage 163 in the valve element connects the area between the lands *a* and *b* with the chamber 164 at the base of the valve element. The area between the lands *a* and *b* is at all times open to a branch of the passage 127 so that fluid under pressure from the passage 127 flows through the passage 163 to the chamber 164 and moves the valve element 162 to the upper end of its range of movement. This movement of the valve element 162 is limited by a cover member 165. When the valve element 162 is in its upper position the area between lands *b* and *c* of the valve element connects pipe 166 leading from the chamber 146 of the lock-up breaker valve 125 to the pipe 167 leading to the flow valve 170. As hereinafter explained the flow valve normally connects the pipe 167 to the sump so the chamber 146 of the lock-up breaker valve 125 is normally at atmospheric pressure.

The valve element 162 has a stem portion which projects through the cover member 165 and is adapted to be engaged by the accelerator pedal 160 when the accelerator pedal is depressed almost all of the way to the end of its range of movement, that is when the vehicle throttle is conditioned to supply fuel to the vehicle engine at the maximum rate. On further movement of the accelerator pedal 160 the valve element 162 is moved against the fluid under pressure in chamber 164 so that land *b* cuts off communication between the pipes 166 and 167, while the area between lands *a* and *b* establishes connection between a branch of the passage 127 and the pipe 166 so that fluid under pressure may flow to the chamber 146 of the lock-up breaker valve 125. Hence, when the accelerator pedal 160 is fully depressed the lock-up breaker valve 125 is caused to establish communication between the passages 127 and 128 and thereby release the lock-up clutch if it is engaged.

When the accelerator pedal is subsequently released, the valve element 162 is returned to its upper position by the fluid under pressure in the chamber 164. On this movement of the valve element 162, the supply of fluid from passage 127 to the chamber 146 is cut off, and the pipe 166 is connected to the pipe 167 so that fluid in the chamber 145 may flow to the sump, thus permitting the piston 145 to return to its upper position so that the lock-up breaker valve 125 again permits the lock-up clutch 25 to be engaged.

The lock-up breaker valve 125 has associated therewith the orifice check valve 171 which limits the rate of release of fluid from the chamber 146 and thus insures that when the lock-up breaker valve 125 is operated to release the lock-up clutch 25, the valve 125 will remain in the operated position long enough to insure release of the lock-up clutch 25 and to also insure that the lock-up clutch remains released for a short time interval. The orifice check valve 171 is located between the pipe 166 and the chamber 146 and comprises a valve element 172 mounted in a chamber 173 and urged to the seated position by a relatively weak spring 174. The valve element 172 has extending therethrough an orifice 175 of restricted flow capacity through which liquid may flow when the valve element is in the seated position. On the supply of liquid to the pipe 166 the valve element 172 is moved against the spring 174 and permits liquid to flow to the chamber 146 at a rapid rate and thus insure prompt operation of the lock-up breaker valve 125 to release the lock-up clutch 25. On the release of liquid from the pipe 166, the valve element 172 is held in the seated position by the spring 174, so liquid flows from the chamber 146 at a slow rate determined by the orifice 175. Hence, upward movement of the piston 145 is relatively slow and the lock-up breaker valve 125 delays re-engagement of the lock-up clutch after its release.

The pumps 101 and 102 also cooperate to control the torque limiting valve 180 which operates as hereinafter described to automatically cause the transmission to shift from its low or first forward range to its high or second forward range when the torque transmitted from the torque converter exceeds a predetermined value. This eliminates torque multiplication in the gear train and prevents the application to the vehicle driving means of torque of such magnitude that it might damage the vehicle driving means.

The torque limiting valve 180, see Fig. 6, comprises a body having aligned bores therein in which are mounted a piston 181 and a piston 182. The piston 181 engages one end of a stem 183 which extends through a bore in the valve body and engages a face of the piston 182. The stem 183 has intermediate its ends a flange 184 of somewhat larger diameter than the remainder of the stem. The flange 184 is movable in a bore in the body of the valve device. The piston 182 is yieldingly urged against the stem 183 by the coil spring 186 so that the flange 184 blocks flow of liquid from a branch of supply passage 127 to the pipe 187 leading through a reverse relay valve 255 to an automatic upshift valve 190. As hereinafter explained upon the supply of fluid under pressure to the valve 190 the transmission is caused to shift to the second forward range, while upon release of fluid from the valve 190 the transmission may shift to the low or first forward range.

In addition, when the stem 183 is in the position to which it is moved by the spring 186, the pipe 187 is connected through the area at one face of the flange 184 to the pipe 191 leading to the sump, while the portion of the bore in the body of the valve device at the face of the flange 184 nearest to the piston 182 has connected thereto a branch of the supply passage 127. This branch of passage 127 has therein a check valve 193 which permits liquid to flow to the valve device 180 and prevents flow of liquid in the opposite direction. On movement of the stem 183 and the piston 182, as explained below, against the spring 186, a drilled passage 185 in the stem 183 permits liquid in the chamber at the left hand side of flange 184 to flow to the chamber 208 at a face of the piston 182. When the stem 183 completes its movement, a portion of the stem of reduced diameter adjacent the flange 184 permits liquid to flow to the pipe 192 and thence to the sump.

The discharge passage leading from pump 101 has therein a choke or restriction 194. The chamber 195 at one face of the piston 181 is connected by a pipe 196 to a point on the upstream or pressure side of the choke 194, while the chamber 197 at the other face of the piston 181 is connected by a pipe 198 with a point on the downstream or discharge side of the choke 194. During operation of the pump 101, the pressure of the fluid on the upstream or pressure side of the choke 194 exceeds the pressure of the fluid on the downstream or discharge side of the choke by an amount which increases with increase in the speed of the pump 101. Hence, the force exerted on the piston 181 and tending to move the piston 181 and the stem 183 against the piston 182 and the spring 186 increases with increases in the speed of the pump 101 which is driven at a rate which varies with the rate of rotation of the torque converter input element 17.

The discharge passage leading from the pump 102 is controlled by a variable orifice valve 200, which is illustrated in Fig. 9 and comprises a tubular bushing or sleeve 201 which is urged by a spring 202 against a seat surrounding the passage leading from the pump 102. The wall of the sleeve 201 has an axially extending slot 203 therein, while a piston 204 is slidably mounted within the sleeve 201 and is moved by a spring 205 towards the end of the sleeve 201 adjacent the pump. Movement of the piston 204 against the spring 205 is limited by engagement of the piston with an inwardly extending flange on the lower edge of the sleeve 201. Liquid discharged from the pump 102 flows to the area within the sleeve 201 and exerts force to move the piston 204 against the spring 205 and thus uncover a larger portion of the slot 203. As the speed of the pump 102 increases, the pressure of the fluid supplied thereby increases and the piston is moved farther against the spring 205 to uncover more of the slot 203 and thus reduce the degree of increase which would otherwise occur in the pressure of the fluid in the passage between the pump 102 and the valve device 200. When the pressure in this passage increases to a predetermined value, the piston 204 is moved against the spring 205 so as to engage the flange on the sleeve 201 with the result that the sleeve 201 is moved against the spring 202 away from its seat and greatly increases the flow capacity of the passage leading from the pump 102 and thus limit further increases in the pressure of the fluid in the passage between the pump 102 and the valve 200. Accordingly, the valve 200 operates to cause the pressure of the fluid in the passage leading from the pump 102 to increase with increases in the speed of the pump 102, but to limit the rate of the increase in pressure.

The chamber 206 on the spring side of the piston 182 of the torque limiting valve 180 is connected by pipe 207 with the passage leading from the pump 102 to the variable orifice valve 200, while the chamber 208 at the other face of the piston 182 is connected by pipe 209 with the supply passage 128. Hence, the piston 182 is subject to the opposing pressures of the fluid in the chambers 206 and 208, and the effective force exerted on the piston by the fluid at the higher pressure in chamber 206 increases as the speed of the pump 102 increases. As previously explained, the pump 102 is operated in accordance with the speed of the output element 20 of the torque converter.

From the foregoing it will be seen that on an increase in the speed of the pump 101, and, therefore, of the torque converter input element, the piston 181 exerts increased force to move the stem 183 against the piston 182 and the spring 186. Similarly, on an increase in the speed of the pump 102, and, therefore, of the torque converter output element, the piston 182 exerts increased force to resist movement of the stem 183, or to return the stem to the position in which it is shown in the drawings.

Hence, when the speed of the pump 101, and of the torque converter input element, increases substantially more than the pump 102 and the torque converter output element, thus indicating high torque multiplication in the torque converted, there will be a corresponding increase in the amount by which the force exerted by the piston 181 exceeds that exerted by the piston 182. The various parts are arranged and proportioned so that when the speed of the torque converter input member exceeds the speed of the torque converted output element by a predetermined amount, the piston 181 will exert force enough to move the stem 183 against the piston 182 and the spring 186.

On this movement of the stem 183 the flange 184 permits liquid to flow from the branch of the passage 127 to the pipe 187 leading to the automatic upshift valve 190 to thereby cause an upshift in the transmission. In addition, at this time the flange cuts off communication between the pipe 187 and the pipe 191 leading to the sump.

On a subsequent reduction in the speed of the torque converter input element, or increase in the speed of the torque converted output element, the amount by which the force exerted by the piston 181 exceeds the force exerted by the piston 182 is reduced, so these pistons and the stem 183 are returned to the position in which they are shown in the drawings and in which the pipe 187 is connected to the pipe 191 leading to the sump.

The various parts are also arranged so that at substantial speeds of the converted output element, the force exerted by the piston 182 and supplementing the force of the spring 186, is so great that the piston 181 is ineffective to move the stem 183. Hence, the automatic upshift of the transmission occurs only when the vehicle is stalled or is operating at a very low speed. This is the only time when excessive torque multiplication in the torque converter is objectionable.

As hereinafter explained, when the vehicle is being operated in reverse and the torque limiting valve detects excessive torque multiplication in the torque converter, the torque applied to the vehicle driving means is reduced by moving the vehicle throttle towards the closed position.

The pressure operated control devices 27, 35 and 65 are manually controlled by the vehicle operator through a master valve device indicated generally by the reference numeral 220 and controlling a main shift valve 222.

The master valve device comprises a valve element 224 slidable in a bore in a body and having pivotally connected thereto one end of a link 225, the other end of which is connected to an arm on a shaft 226 which is rotatable by an arm or lever 227. The arm or lever 227 governing the shaft 226 has an intermediate or neutral position N and is movable therefrom in one direction to a first or a second forward position, designated F1 and F2, while the arm or lever 227 is movable in the other direction from the neutral position N to a reverse position R.

The shaft 226 is mounted in a bore in the valve body and the shaft has in its surface a groove 228 which is arranged to connect the pipe 230 leading to the chamber 76 of the reverse pressure operated control device 65 to the sump in the neutral and forward positions of the handle 227. In the reverse position R of the handle 227, the groove 228 connects the pipe 230 to the supply pipe 240 while communication between the pipe 230 and the sump is cut off.

As hereinafter explained, the valve element 224 controls release of fluid from a chamber of the main shift valve 222.

The main shift valve 222 comprises a valve element 232 mounted in a bore in a valve body and secured to a piston 233 of somewhat larger diameter than the valve element 232. The piston 233 is mounted in a bore in the body of the valve device and has at its upper face a chamber 234 to which is connected a branch of the supply pipe 106. The piston 233 has at its lower face the chamber 235 which is connected with the chamber 234 by a passage 236 of limited flow capacity. The effective area of the upper face of the piston 233 is reduced by the area of the valve stem so that when the fluid in the chambers 234 and 235 is at the same pressure, the force exerted by the fluid in the chamber 235 exceeds that exerted by the fluid in the chamber 234, but so that on sufficient reduction in the pressure of the fluid in the chamber 235 the force exerted by the fluid in the chamber 234 will substantially exceed the force exerted by the fluid in the chamber 235. The valve element 224 of the master valve 220 controls passages 237 and 238 through which liquid may be released from the chamber 235 of the main shift valve 222. When the valve element is in the position which it occupies when the arm or handle 227 is in the neutral position N or the reverse position R, the passages 237 and 238 are both blocked and the liquid flowing through passage 236 in the piston 233 of the main shift valve 222 increases the pressure to the pressure present in chamber 235 so the piston 233 and the valve element 232 move to the upper end of their range of movement. This is the neutral position of these members and at this time the chambers of the pressure operated control devices 27 and 35 are both connected to the sump so both of these devices are released.

When the handle 227 is moved to the first forward position F1, the valve element 224 uncovers the end of passage 237, but continues to block passage 238. Hence, liquid may flow from the passage 237 to the chamber in the valve device 220 and thence to the sump. The passage 237 communicates with the chamber 235 in the main shift 222 at an intermediate point in the chamber, and is of greater flow capacity than the passage 236 through the piston 233. On release of liquid from the chamber 235 through the passage 237 there is a reduction in the pressure in the chamber 235 and the piston 233 is moved downwardly by the fluid under pressure in the chamber 234 until the lower edge of the piston partially closes the passage 237 and restricts flow of liquid from the chamber 235. On this movement of the piston 233 there is a corresponding movement of the valve element 232 so the valve element is moved to its position F1 in which the chamber of pressure operated control device 35 is connected to pipe 240 leading from the flow valve 170, while the chamber of pressure operated control device 27 continues to be connected to the sump. Liquid under pressure is supplied through the pipe 240 leading from the flow valve so the pressure operated control device 35 is engaged.

When the handle 227 is moved to the second forward position F2, the valve element 224 uncovers the passage 238 as well as the passage 237. The passage 238 connects with the chamber 235 at a lower level than the passage 237, and like the passage 237 has greater flow capacity than the passage 236. Hence, when passage 238 is uncovered the piston 233 moves to a lower level and moves the valve element 232 a corresponding amount to its position F2 in which the chamber of pressure operated control device 35 is connected to the sump, and in which the chamber of clutch 27 is connected to the pipe 240 leading from the flow valve 170. Hence, clutch 27 is engaged and pressure operated control device 35 is released.

On subsequent movement of the handle 227 of the master valve device 220 to the N or R position, the valve element 224 is moved to the position to cut off flow of liquid from passages 237 and 238 so the pressure of the liquid in chamber 235 builds up and returns the piston 233 and the valve element 232 to the upper end of their range of movement so that pressure operated control devices 27 and 35 are both released, and the pipe 240 leading from the flow valve 170 is blocked.

The flow valve 170 provides means automatically operative on engagement of a pressure operated control device to supply fluid under pressure to the lock-up breaker valve 125 for a short period, and to thereafter release fluid from the lock-up breaker valve. The flow valve 170 comprises a valve element 242 mounted in a bore in a valve body and subject to the opposing pressures of the fluid in a chamber 243 to which is connected the pipe 112 leading from the valve 110, and of the fluid in the chamber 245 to which a branch of the pipe 240 is connected. The valve element 242 has therein a passage 246 of restricted capacity through which liquid may flow from the chamber 243 to the pipe 240 when the valve element 242 is in the closed position. Hence, the pressure of the fluid in the chambers 243 and 245 equalizes and the valve element 242 is held in the closed position by the spring 247, so that the area between lands $a$ and $b$ of the valve element 242 connects to the sump the pipe 167 leading from the chamber 146 of the lock-up breaker valve 125.

When the main shift valve 222, or the master valve device 220, is operated to connect pipe 240 to the chamber of one of the pressure operated control devices 27, 35 or 65, there is a sudden reduction in the pressure of the fluid in the pipe 240 and in the connected chamber 245 of the flow valve 170. Hence, the valve element 242 is moved against the spring 247 by the fluid under pressure in the chamber 243 to the open position of the valve element in which the upper end of the valve element 242 engages the end wall of the chamber 245. When the valve element is moved to its open position the land $a$ blocks the passage leading to the sump, while pipe 167 is connected to a branch of the pipe 106 so that liquid under pressure is supplied to the chamber 146 of the lock-up breaker valve 125 and causes this valve to release the lock-up clutch 25 if the lock-up clutch is engaged and the engine is operating at a speed above its idling range. In addition, on movement of the valve element 242 of the flow valve 170 to the open position, the chamber 243 is connected to the pipe 240 so that liquid from pipe 112 flows to pipe 240 and thus to the chamber of the pressure operated control device which is being applied and the pressure of the liquid in the pressure operated control device chamber builds up, while there is a corresponding increase in the pressure of the liquid in chamber 245 of the flow valve 170. When the pressure of the liquid in the chamber 245 approaches that of the liquid in chamber 243 the valve element 242 is moved by the spring 247 from the open to the closed position so that the supply of liquid under pressure to pipe 167 leading to the lock-up breaker valve 125 is cut off and the pipe 167 is connected to the sump to release liquid from the chamber 146 of the lock-up breaker valve. In addition, when the valve element 242 moves to the closed position the direct connection of pipe 240 with the chamber 243 is cut off and liquid is thereafter supplied to the pipe 240 through the orifice 246 which has sufficient flow capacity to supply liquid to a clutch chamber to make up for leakage from the chamber and thus maintain engagement of the clutch.

As previously explained, the check valve 171 limits the rate of release of liquid from the chamber 146 of the lock-up breaker valve 125 so that this valve remains in the operated position long enough to insure release of the lock-up clutch 25 even though the flow valve 170 is open for only a brief time interval.

The automatic up-shift valve 190 provides means to automatically control the main shift valve 222 in response to operation of the torque limiting valve 180. The automatic upshift valve 190 comprises a valve element 250 mounted in a bore in a body and subject to the opposing forces of the liquid in a chamber 251 to which is connected the pipe 187 leading from the torque limiting valve 180, and of a coil spring 252 which is mounted in the chamber 253 which is constantly connected to the sump. As previously explained, the torque limiting valve 180 normally connects the pipe 187 to the sump so the chamber 251 is normally substantially at atmospheric pressure and the spring 252 holds the valve element 250 in the closed position in which it blocks a branch of the passage 238 leading from the main shift valve 222.

On the supply of liquid under pressure through the pipe 187 to the chamber 251 the valve element 250 is moved against the spring 252 to the open position in which the passage 238 is connected through a passage 254 in the valve element 250 to the chamber 253 and thus to the sump. Accordingly, liquid is released from the chamber 235 of the main shift valve 222 through the passage 238 and the valve 222 operates in the usual manner to cause the pressure operated control device 35 to be released and the pressure operated control device 27 to be engaged.

On subsequent operation of the torque limiting valve 180 to release liquid from the pipe 187, and thus from the chamber 251 of the automatic up-shift valve 190, the valve element 250 is moved by the spring 252 to the closed position to cut off release of liquid through the passage 238 and thus cause the main shaft valve to return to the position determined by the passage 237 with the result that the clutch 27 is disengaged and pressure operated control clutch device 35 is engaged.

The equipment is arranged so that where the vehicle is being operated in reverse, and the torque limiting valve 180 operates to supply liquid to the pipe 187, the vehicle throttle will be closed for a short time interval to reduce the torque output of the engine. As shown, there is a reverse relay valve 255 which has a valve element 256 subject to the opposing pressures of a coil spring 257 and of the liquid in a chamber 258 to which is connected a branch of the pipe 230 leading to the chamber of the reverse pressure operated control device 65. As long as the reverse pressure operated control device is released the valve element 256 of the reverse relay valve 255 is in its normal position in which it connects to the automatic up-shift valve 190 the pipe 187 leading from the torque limiting valve 180. In addition, when the valve element 256 is in its normal position, the pipe 260 leading from the chamber 261 of the throttle actuating device 262 is connected to the sump.

On the supply of liquid to the chamber of the reverse pressure operated control device 65, and thus to the chamber 258 of the reverse relay valve 255, the valve element 256 is moved to its operated position in which the pipe 187 leading from the torque limiting valve 180 is connected to the pipe 260 leading to throttle actuating device 262. In addition, in the operated position of the valve element 256, the pipe leading to the chamber 251 of the automatic up-shift valve 190 is connected to the sump.

The throttle actuating device 262 comprises a piston 264 mounted in a bore in a body and subject to the opposing pressures of a coil spring 263 and of the fluid in the chamber 261. On an increase in the pressure of the fluid in the chamber 261 the piston 264 is moved against the spring 263 and the stem of the piston exerts force on the throttle linkage to move the engine throttle at least a substantial distance towards the idling position. The pipe 260 leading to the chamber 261 of the throttle actuating device 262 has interposed therein an orifice check valve 265 which is similar in construction and operation to the valve 171 and which operates to permit prompt operation of the throttle actuating device 262 to move the throttle toward the idling position, but to delay subsequent opening of the throttle.

It will be seen that when the reverse pressure operated control device 65 is engaged, the reverse relay valve 255 renders the automatic up-shift valve 190 inoperative and connects the pipe 187 leading from the torque limiting valve 180 to the throttle actuating device 262 so that on operation of the torque limiting valve 180 to supply liquid to the pipe 187, the throttle actuating device 262 closes the engine throttle and thus reduces the torque output of the engine. As a result of the reduction in the speed of the engine, the torque limiting valve 180 may release liquid from the pipe 187, and thus from the chamber 261 of the throttle actuating device 262, and thus cause the engine throttle to be opened.

This control system includes an inhibitor valve 270 which operates to prevent a manual shift from the second or high forward range to the first or low forward range when the vehicle speed is so high that such a shift might be damaging to the transmission and engine.

The inhibitor valve 270, Fig. 7, comprises a valve element 271 mounted in a bore in a body and subject to the opposing pressures of the fluid in a chamber 272, and of the fluid in a chamber 273 together with the force exerted by a coil spring 274 mounted in the chamber 273. The chamber 273 has connected thereto the passage 238 leading from the chamber 235 of the main shift valve 222 so that the fluid in the chamber 273 is normally substantially at the pressure of the liquid in the pipe 106 from which liquid is supplied to the chamber 235, while the pressure of the liquid in the chamber 273 is reduced when the pressure of the liquid in the chamber 235 is reduced because of release of liquid therefrom through the passages 237 and 238.

The chamber 272 is connected by pipe 275 with the governor 276 which controls the supply of liquid from a branch of pipe 106 to the pipe 275 and also controls release of liquid from the pipe 275. The governor 276 is of well known construction, as explained below, and is operated from the transmission ouput shaft 46 so as to operate at a speed varying in accordance with the vehicle speed. The governor operates in the usual manner to supply liquid from pipe 106 to the pipe 275 so as to maintain the pressure of the liquid in the pipe 275 and thus in the chamber 272 at values varying in accordance with the vehicle speed, and to cause the liquid in the chamber 272 to be at the full value of the liquid in the pipe 106 when the vehicle speed exceeds a predetermined relatively high value. The governor 276 may be constructed as shown in Fig. 5 of U. S. Patent No. 2,204,872 issued June 18, 1940 to E. A. Thompson.

The body of the governor 276 is rotated about an axis located between the valve elements in this body so that the valve element controlling flow of liquid from pipe 106 to pipe 275 is urged radially outwardly by centrifugal force. Liquid under pressure supplied through pipe 106 flows through the passage in the valve element to the chamber at the end of the valve element and exerts force to move the valve element radially inwardly to cut off the supply of liquid from pipe 106. Hence, the pressure in the chamber at the end of the valve element is maintained at the value required to balance the centrifugal force on the valve element. As centrifugal force increases with the speed of rotation of the governor, the pressure in the chamber at the end of the valve element increases with the speed of the governor. The pipe 275 is constantly connected to the chamber at the end of the governor valve element so the pressure in the pipe 275 varies with the pressure in this chamber.

When the vehicle is idle or is operating at low speed, the liquid in the chamber 272 is at a low ineffective pressure and the valve element 271 is moved by the force exerted by the spring 274 and by the liquid under pressure in the chamber 273 to the closed position in which the valve element 271 cuts off flow of liquid from the chamber 273 to the passage 278 leading to the sump.

When the vehicle is being operated at high speed, the governor 276 causes liquid to be supplied to the chamber 272 substantially at the full pressure of the liquid being supplied to the pipe 106. When the vehicle is being operated at high speed the transmission is in the second forward range and the pressure of the liquid in the passage 238, and in the chamber 273, is reduced because of release of liquid therefrom through the master valve device 220, or through the automatic upshift valve 190. Accordingly, when the transmission is in the second forward range and the vehicle speed reaches the predetermined high value, the valve element 271 is moved against the spring 274 and the pressure of the fluid in the chamber 273 to the open position by the force exerted by the liquid in the chamber 272. This movement of the valve element 271 is limited by engagement of the valve element with a lock ring 280 mounted in a groove in the bore in the body of the valve device. When the valve element 271 is moved to the open position, connection is established from the chamber 273 through a passage 281 in the valve element to the passage 278 leading to the sump. The passage 281 permits liquid to flow from the chamber 273, and thus from the passage 238 and the chamber 235 of the main shift valve 222 so as to insure that the piston 233 and valve element 232 of the main shift valve 222 remain in the position to maintain the pressure operated control device 27 engaged and the pressure operated control device 35 disengaged even if the master valve device 220 is manipulated to cut off release of fluid from the passage 238.

When the valve element 271 is in the open position, the liquid in the chamber 273 is maintained at an intermediate value substantially below that of the liquid in the pipe 106, and below that of the liquid supplied through the governor 276 to the chamber 272 at high vehicle speeds. However, as the speed of the vehicle is reduced, the pressure of the liquid supplied through the governor 276 to the chamber 272 is reduced, and when the vehicle speed is reduced to a rate at which it is safe for the transmission to be shifted from the second to the first forward range, the perssure of the liquid in the chamber 272 is reduced to such a low level that it is ineffective to hold the valve element 271 against the force exerted by the spring 274 and by the liquid under pressure in the chamber 273. Hence, when the vehicle speed is reduced to a safe level, the valve element 271 is moved to the closed position to cut off release of liquid from the passage 238 and from the chamber 235 of the main shift valve 222. Accordingly, if the master valve device 220 has been manipulated to cut off release of liquid from the passage 238, but to permit release of liquid from passage 237, the main shift valve operates to release the pressure operated control device 27 and to engage the pressure operated control device 35.

*Operation of control system*

The construction and operation of various elements of the control system having been described in detail, the operation of the system as a whole will now be considered. For purposes of illustration it will be assumed that the handle 227 of the master valve 220 is in its neutral position N, and that the engine of the vehicle is operating substantially at the idling speed.

As the handle of the master valve device 220 is in the neutral position, the pressure operated control devices 27, 35 and 65 are released and the transmission is ineffective to transmit torque to the output shaft 46. At this time the engine driven pump 101 is operating at a low speed, while the pump 102, which is driven from the converter output shaft, is also operating, and supplies liquid to the second supply passage 128. However, as explained below, as the engine is operating in its idling range, the lock-up breaker valve 125 keeps the lock-up clutch 25 disengaged.

In addition, at this time the engine driven pump 104 is operating and supplies liquid under pressure to the pipe 106 from which liquid is supplied through the pressure regulating valve 110 to the pipe 112 and thus to the pipe 116 of the torque converter circulating system. As the engine is assumed to be operating, the engine driven pump 103 circulates liquid through the torque converter at a low rate with the result that the pressure difference on opposite sides of the converter orifice valve 120 is relatively small, but is great enough to cause the lock-up breaker valve 125 to maintain the lock-up clutch released.

Liquid supplied to the pipe 106 flows to the chamber 235 of the main shift valve 222 and causes the piston 233 and the valve element 232 to move to the extreme upper end of their range of movement in which the chambers of the pressure operated control devices 27 and 35 are connected to the sump.

If the operator wishes to drive the vehicle in the forward direction he may do so by moving the handle 227 of the master valve device 220 to one of its forward positions and thereafter depressing the accelerator pedal. For purposes of illustration it will be assumed that the handle 227 is moved to the position F1, thereby moving the valve element 224 to the position to release liquid from the passage 237 and cause the main shift valve 222 to operate as previously described to effect engagement of the pressure operated control device 35 by supplying liquid thereto from the pipe 240.

As a result of the supply of liquid from the pipe 240 the flow valve 170 operates as previously described to supply liquid to the lock-up breaker valve 125 and to thereafter release liquid therefrom. At this time the lock-up clutch is assumed to be disengaged so the supply of liquid to the lock-up breaker valve has no effect.

On engagement of the pressure operated control device 35 the transmission is conditioned to transmit torque to the output shaft 46 on rotation of the torque converter output element 20. When the engine is accelerated as a result of opening of the throttle valve, the torque converter operates in the usual manner to cause the output element 20 to rotate and to drive the vehicle.

As a result of the increase in the engine speed the pump 101 operates at a more rapid rate and there is an increase in the force exerted by piston 181 of the torque limit valve 180 and tending to move the stem 183 of this valve. However, if the vehicle accelerates in the normal manner there will be an accompanying increase in the speed of the pump 102, and the force exerted by the piston 182, and opposing movement of the stem 183, will build up fast enough to prevent movement of the stem 183 and thus prevent operation of the torque limit valve 180.

As the vehicle speed increases, the speed of the pump 102, which is driven from the torque converter output shaft, also increases and gradually approaches the speed of the engine or torque converter input driven pump 101. As previously explained, when operating conditions are such that the speed of the torque converter output element reaches substantially 80% of that of the torque converter input element, the pump 102 will cause the pressure in the second supply passage 128, and therefore in the chamber 53 of the lock-up clutch, to be increased to a value sufficient to initiate engagement of the lock-up clutch. As soon as the lock-up clutch 25 starts to engage, the speed of the pump 102 relative to that of the pump 101 is increased so there is a corresponding increase in the force tending to cause engagement of the lock-up clutch.

When the lock-up clutch becomes engaged, the speed reduction and torque multiplication previously occurring in the torque converter is eliminated and the engine drives the vehicle through the transmission gears.

As long as the engine is operating in the idling speed range, that is in the speed range between 400 and 800 R. P. M., the piston 150 of the lock-up breaker valve 125 holds the valve element 140 in the position to establish communication between supply passages 127 and 128 and thus maintains the lock-up clutch 25 released. As soon as the engine speed is increased above the idling range the piston 150 moves the valve element 140 far enough to interrupt communication between the supply passages 127 and 128 and thus permits engagement of the lock-up clutch when conditions become proper for it to be engaged.

If the operator wishes to increase the speed of the vehicle he may do so by shifting the handle 227 of the master valve device 220 to the position F2. On this movement of the handle 227 the valve element 224 is moved to the position to release fluid from the passage 238 and thus causes the main shift valve 222 to operate, as previously described, to release the pressure operated control device 35 and to cause liquid to be supplied from the pipe 240 to the chamber of the pressure operated control device 27 and thus effect engagement of the pressure operated control device 27. When the pipe 240 is connected to the chamber of the pressure operated control device 27, the flow valve 170 operates as previously described, to initially supply liquid under pressure through pipe 167 to the lock-up breaker valve 125 and thus move the piston 145 against the spring 144 and cause the lock-up breaker valve to connect the first supply passage 127 and the second passage 128 together and thus release the lock-up clutch 25.

The release of the lock-up clutch 25 occurs promptly upon initiation of the supply of liquid under pressure to the pressure operated control device 27. Hence, said lock-up clutch becomes disengaged before the pressure of the liquid in the chamber of the pressure operated control device 27 is built up to a value high enough to cause substantial engagement of this pressure operated control device. As previously explained, the flow valve 170 operates to connect the pipe 167 to the sump as soon as one of the pressure operated control devices becomes substantially fully engaged. However, the orifice check valve 171 restricts the rate of release of liquid from the chamber 146 of the lock-up breaker valve 125 and delays operation of the lock-up breaker valve to permit re-engagement of said lock-up clutch. Hence, the lock-up clutch is certain to remain disengaged for a short time interval subsequent to the change in the transmission gearing, and during this period the engine will drive the vehicle through the torque converter.

As previously explained, when the pressure operated control device 27 is engaged the planetary gear train of the transmission is locked out and the only speed reduction and torque increase which occurs is that provided by the torque converter.

When operating conditions again become such that the speed of the torque converter output element approaches the speed of the torque converter input element the lock-up clutch 25 is automatically engaged so that the engine is directly connected to the transmission output shaft.

The operator is free to move the handle 227 of the master valve device 220 from the position F2 to the position F1 so as to shift the transmission from the second forward range to the first forward range. However, this shift will not take place if the vehicle speed is so high that such a shift might damage the transmission or engine.

As previously explained, when the vehicle is being operated with the transmission in the second forward range and the vehicle is operating at a relatively high speed, the inhibitor valve 270 connects a branch of the passage 238 to the sump and thus insures that the main shift valve 222 will not respond to movement of the handle of the master valve device 220 until the vehicle speed is reduced to a value which makes it safe for the transmission to be shifted to the lower speed range.

The operator may cause release of the lock-up clutch 25 at any time when the engine is operating at a speed above its idling range. For example, when the vehicle is being operated in one of the forward ranges F1 or F2 with the lock-up clutch 25 engaged, the operator may desire an increase in torque and he can secure this increase by releasing the lock-up clutch and causing the vehicle to be driven through the torque converter. In order to cause release of the lock-up clutch it is only necessary for the operator to fully depress the accelerator pedal 160. This causes the valve device 161 to transfer connection of the pipe 166 leading from the lock-up breaker valve 125 from the pipe 167 to a branch of the supply passage 127. Accordingly, as long as the accelerator pedal 160 is fully depressed liquid under pressure will be supplied from the passage 127 to the chamber 146 of the lock-up breaker valve 125 and the lock-up breaker valve will maintain the lock-up clutch 25 released.

On subsequent release of the accelerator pedal 160 the valve device 161 cuts off the supply of liquid under pressure from the pipe 127 to the lock-up breaker valve 125 and connects the lock-up breaker valve to the pipe 167 and thus to the sump through the flow valve 170. Accordingly, the lock-up breaker valve 125 again operates to permit engagement of the lock-up clutch 25.

If the operator has the transmission in one of the forward speed ranges and operates the engine at a relatively high speed with the vehicle stalled, the torque limit valve 180 operates, as previously described, to supply liquid to the pipe 187 and thus causes the automatic up-shift valve 190 to release liquid from the passage 238. On the release of liquid from the passage 238, the main shift valve 222 is caused to occupy its second forward position if it is not already in that position. If the main shift valve 222 had been in the first forward position in which it caused the pressure operated control device 35 to be engaged and the pressure operated control device 27 to be released, excessive torque might be applied to the vehicle drive train and might cause damage thereto. However, as a result of movement of the main shift valve 222 to the second forward position the pressure operated control device 35 is released and the pressure operated control device 27 is engaged so that there is a substantial reduction in the torque applied to the vehicle drive train.

When it is desired to operate the vehicle in the reverse direction the handle 227 is moved to the reverse position R in which the valve element 224 blocks both passages 237 and 238 and causes the main shift valve 222 to occupy its neutral position in which the pressure operated control devices 27 and 35 are both released.

In addition, on movement of the handle 227 to the position R a connection is established to supply liquid from the pipe 240 to the pipe 230 leading to the chamber of the piston associated with the reverse pressure operated control device 65 and thus effect engagement of the pressure operated control device 65. On the supply of liquid to the pipe 230, liquid flows through a branch thereof to the reverse relay valve 255 and causes it to interrupt connection between the pipe 187 and the automatic up-shift valve 190, and to establish connection between the pipe 187 and the pipe leading to the throttle actuating device 262.

Accordingly, if, while the transmission is in reverse, the engine is operated at a relative high speed with the vehicle stalled so that the torque limiting valve 180 supplies liquid to the pipe 187, this liquid will flow to the throttle actuating device 262 and will cause it to move the accelerator pedal and the throttle to the idling position. This reduces the engine speed and the torque output of the engine and thus prevents damage which might otherwise occur to the vehicle drive train.

This control system is arranged so that the lock-up clutch 25 is automatically released when the vehicle is being brought to a stop or the vehicle speed is reduced to a low value. When the vehicle is being operated with the transmission in one of the forward ranges and with the lock-up clutch 25 engaged, said lock-up clutch will not be released as a result of release of one of the pressure operated control device 27 or 35. However, as the engine speed reduces to a value in the engine idling range, either while a pressure operated control device 27 or 35 other than the lock-up clutch 25 is still engaged or after the pressure operated control device has become released, the lock-up breaker valve 125 operates automatically to release said lock-up clutch. This permits the vehicle to be brought to a stop without stalling the engine even though one of the manually controlled pressure operated control devices 27 or 35 remains engaged.

Although we have illustrated and described one form of transmission control system embodying our invention, it should be understood that the invention is not limited to the specific details illustrated and described and that numerous changes and modifications may be made therein without departing from the spirit and scope of the following claims.

We claim:

1. In combination, a shaft from which power may be transmitted to a load, a hydraulic torque converter having a driving element adapted to be driven by an engine and having a driven element connected to said shaft, a lock-up clutch effective when engaged to couple said engine to said shaft independent of said torque converter, a first control means responsive to rotation of said torque converter driven element at a predetermined proportion of the speed of said torque converter driving element for effecting engagement of said lock-up clutch, and a second control means responsive to the rate of rotation of said torque converter driving member for rendering said first control means ineffective during operation of the engine at a speed above a selected slow rate and below a selected more rapid rate.

2. In combination, a shaft from which power may be transmitted to a load, a hydraulic torque converter having a driving element adapted to be driven by an engine and having a driven element connected to said shaft, a lock-up clutch effective when engaged to couple said engine to said shaft independent of said torque converter, a first control means responsive to rotation of said torque converter driven element at a predetermined proportion of the speed of said torque converter driving element for effecting engagement of said lock-up clutch, and a second control means responsive to the rate of rotation of said torque converter driving member for maintaining said lock-up clutch disengaged during operation of said engine at a speed above a selected slow rate and below a selected more rapid rate irrespective of operation of said first control means.

3. In a transmission for a self-propelled vehicle having an engine governed by a throttle member movable from a closed to an open position for increasing the rate at which fuel is supplied to said engine, a shaft from which power may be transmitted to means for driving said vehicle, a hydraulic torque converter having a driving element driven by said engine and a driven element connected to said shaft, a lock-up clutch effective when engaged to couple said engine to said shaft independent of said torque converter, a control member biased to a first position, means responsive to the rate of rotation of the vehicle engine for moving said control member from said first position to a second position when said engine is operating at a speed above a selected slow rate and below a selected more rapid rate and for moving said control member from said second position to a third position when said engine is operating at a speed above said selected more rapid rate, means effective when said throttle member is adjacent its open position for moving said control member from its third to its second position, and means for effecting engagement of said lock-up clutch provided said control member is in its first or its third position.

4. In a transmission for a self-propelled vehicle having an engine governed by a throttle member movable from a closed to an open position for increasing the rate at which fuel is supplied to said engine, a shaft from which power may be transmitted to means for driving said vehicle, a hydraulic torque converter having a driving element driven by said engine and a driven element connected to said shaft, a lock-up clutch effective when engaged to couple said engine to said shaft independent of said torque converter, a control member biased to a first position, means responsive to the rate of rotation of the vehicle engine for moving said control member from said first position to a second position when said engine is operating at a speed above a selected slow rate and below a selected more rapid rate and for moving said control member from said second position to a third position when said engine is operating at a speed above said selected more rapid rate, means effective when said throttle member is adjacent its open position for moving said control member from its third to its second position, and means responsive to rotation of said torque converter driven element at a predetermined proportion of the speed of said torque converter driving element for effecting engagement of said lock-up clutch provided said control member is in its first or its third position.

5. In a transmission for a self-propelled vehicle having an engine, an input shaft, an output shaft, a hydraulic torque converter having a driving element driven by said engine and a driven element connected to said input shaft, a lock-up clutch effective when engaged to couple said engine to said input shaft independent of said torque converter, means for effecting engagement of said lock-up clutch, means including a first fluid pressure operated device for at times establishing driving connection between said input and output shafts, means including a second fluid pressure operated device for at other times establishing driving connection between said input and output shafts, and means responsive to the supply of fluid under pressure to one of said fluid pressure operated devices for causing release of said lock-up clutch.

6. In a transmission for a self-propelled vehicle having an engine, an input shaft, an output shaft, a hydraulic torque converter having a driving element driven by said engine and a driven element connected to said input shaft, a lock-up clutch effective when engaged to couple said engine to said input shaft independent of said torque converter, means for effecting engagement of said lock-up clutch, means including a first fluid pressure operated device for at times establishing driving connection between said input and output shafts, means including a second fluid pressure operated device driving for at other times establishing driving connection between said input and output shafts, and means responsive to the supply of fluid under pressure to either one of said fluid pressure operated devices for causing release of said lock-up clutch.

7. In a transmission for self-propelled vehicle having an engine shaft, an input shaft, an output shaft, a hydraulic torque converter having a driving element driven by said engine shaft and a driven element connected to said input shaft, a lock-up clutch effective when engaged to couple said engine shaft to said input shaft independent of said torque converter, means for effecting engagement of said lock-up clutch, a first driving means for at times connecting said input and output shafts together through gears providing a selected speed reduction, a second driving means for at times connecting said input and output shafts together through means providing a smaller speed reduction than that provided by said first driving means, and a control device operatively connected to said torque converter and responsive to the rates of rotation of said torque converter driving and driven elements, said control device being effective only when said torque converter driven element is rotating at less than a selected relatively slow rate and said torque converter driving element is rotating at a rate which is substantially faster than the rate at which said driven element is rotating, for causing disengagement of said first driving means and for causing engagement of said second driving means.

8. In a transmission for a self-propelled vehicle having an engine, an input shaft driven by said engine, an output shaft from which power may be transmitted to means for driving said vehicle, a first driving means for connecting said input and output shafts together through gears providing a selected speed reduction, a second driving means for connecting said input and output shafts together through means providing a smaller speed reduction than that provided by said first driving means, manually controlled means for at times rendering said first driving means effective and for at other times rendering said second driving means effective, and means responsive to the rate of rotation of said output shaft for maintaining said second driving means effective irrespective of said manually controlled means as long as the speed of said output shaft exceeds a selected relatively rapid rate.

9. In combination, an engine, an output shaft from which power may be transmitted to drive a load, a hydraulic torque converter having a driving element driven by said engine and a driven element coupled to said output shaft, torque control means effective when actuated to limit the torque delivered to said output shaft, and a control device responsive to the rates of rotation of said torque converter driving and driven elements, said control device being effective only when said torque converter driven element is rotating at less than a selected relatively slow rate and said torque converter driving element is rotating at a rate which is substantially faster than the rate at which said driven element is rotating to actuate said torque control means.

10. In combination, a shaft from which power may be transmitted to drive a load, a hydraulic torque converter having a driving element adapted to be driven by an engine and a driven element coupled to said shaft, a lock-up clutch effective when engaged to couple said engine to said shaft independent of said torque converter, a first pump operated at a speed varying in accordance with the speed of said torque converter driven element, a second pump operated at a speed varying in accordance with the speed of said torque converter driving element, a control passage connecting the outlet of said first pump with the inlet of said second pump, and means responsive to the pressure of the fluid in said control passage for effecting engagement of said lock-up clutch.

11. In combination, a shaft from which power may be transmitted to drive a load, a hydraulic torque converter having a driving element adapted to be driven by an engine and a driven element coupled to said shaft, a lock-up clutch effective when engaged to couple said engine to said shaft independent of said torque converter, a first pump operated at a speed varying in accordance with the speed of said torque converter driven element, a second pump operated at a speed varying in accordance with the speed of said torque converter driving element, a control passage connecting the outlet of said first pump with the inlet of said second pump, said pumps and the driving means therefor being arranged so that the capacity of said first pump equals the capacity of said second pump when the speed of said torque converter driven element is a selected proportion of the speed of said torque converter driving element, and means responsive to the pressure of the fluid in said control passage for effecting engagement of said lock-up clutch.

12. In combination, an input shaft, an output shaft, means including a pressure operated control device operative on an increase in the pressure of the liquid in a chamber to establish driving engagement between said input and output shafts, a hydraulic torque converter having a driving element adapted to be driven by an engine and a driven element coupled to said input shaft, a lock-up clutch effective when engaged to couple said engine to said input shaft independently of said torque converter, a first pump operated at a speed varying in accordance with the speed of said torque converter driven element, a second pump operated at a speed varying in accordance with the speed of said torque converter driving element, a control passage connecting the outlet of said first pump with the inlet of said second pump, means responsive to the pressure of the fluid in said control passage for effecting engagement of said lock-up clutch, and means responsive to the supply of liquid to the chamber of said pressure operated control device for releasing fluid from said control passage.

13. In combination, an input shaft, an output shaft, means including a pressure operated control device operative on an increase in the pressure of the liquid in a chamber to establish driving engagement between said input and output shafts, a hydraulic torque converter having a driving element adapted to be driven by an engine and a driven element coupled to said input shaft, a lock-up clutch effective when engaged to couple said engine to said input shaft independently of said torque converter, a first pump operated at a speed varying in accordance with the speed of said torque converter driven element, a second pump operated at a speed varying in accordance with the speed of said torque converter driving element, a control passage connecting the outlet of said first pump with the inlet of said second pump, means responsive to the pressure of the fluid in said control passage for effecting engagement of said lock-up clutch, means responsive to the supply of liquid to the chamber of said pressure operated control device for releasing fluid from said control passage, and means governed in accordance with the rate of supply of fuel to said engine for also releasing fluid from said control passage.

14. In combination, a shaft from which power may be transmitted to drive a load, a hydraulic torque converter having a driving element adapted to be driven by an engine and a driven element coupled to said shaft, a lock-up clutch effective when engaged to couple said engine to said shaft independent of said torque converter, a first pump operated at a speed varying in accordance with the speed of said torque converter driven element, a second pump operated at a speed varying in accordance with the speed of said torque converter driving element, a control passage connecting the outlet of said first pump with the inlet of said second pump, means responsive to the pressure of the fluid in said control passage for effecting engagement of said lock-up clutch, and means effective during rotation of said torque converter driving element at the rate at which it is driven when the engine is operating in its idling range for releasing fluid from said control passage.

15. In combination, a shaft from which power may be transmitted to drive a load, a hydraulic torque converter having a driving element adapted to be driven by an engine and a driven element coupled to said shaft, a lock-up clutch effective when engaged to couple said engine to said shaft independent of said torque converter, a first pump operated at a speed varying in accordance with the speed of said torque converter driven element, a second pump operated at a speed varying in accordance with the speed of said torque converter driving element, a control passage connecting the outlet of said first pump with the inlet of said second pump, means responsive to the pressure of the fluid in said control passage for effecting engagement of said lock-up clutch, a valve operative on an increase in the pressure of the fluid in a chamber to release fluid from said control passage, a throttle member movable from a closed to an open position for increasing the rate of supply of fuel to said engine, means effective when said throttle member is adjacent its open position to supply fluid under pressure to said chamber, and means for releasing fluid from said chamber at a restricted rate.

16. In combination, a shaft from which power may be transmitted to drive a load, a hydraulic torque converter having a driving element adapted to be driven by an engine and a driven element coupled to said shaft, a first pump operated at a speed varying in accordance with the speed of said torque converter driven element, a second pump operated at a speed varying in accordance with the speed of said torque converter driving element, a control passage connecting the outlet of said first pump with the inlet of said second pump, a lock-up clutch operative on an increase in the pressure of the fluid in a chamber to couple said engine to said shaft together independently of said torque converter, and means for supplying fluid from said control passage to the chamber of said lock-up clutch.

17. In combination, an input shaft, an output shaft from which power may be transmitted to a load, a first driving means for connecting said input and output shafts together through gears providing a selected speed reduction, a second driving means for connecting said input and output shafts together through means providing a smaller speed reduction than that provided by said first driving means, manually controlled means for at times rendering said first driving means effective and for at other times rendering said second driving means effective, a hydraulic torque converter having a driving element adapted to be driven by an engine and a driven element coupled to said input shaft, a first pump driven in accordance with the rate of rotation of said torque converter driving element and supplying fluid through a first orifice, a second pump driven in accordance with the rate of rotation of said torque converter driven element and supplying fluid through a second orifice, and means subject to the opposing pressures of the fluid intermediate said first pump and said first orifice and of the fluid intermediate said second pump and said second orifice for automatically rendering said first driving means ineffective and for automatically rendering said second driving means effective.

18. In combination, an input shaft adapted to be driven by an engine, an output shaft from which power may be transmitted to a load, a first pressure operated device operative to establish driving connection between said input and output shafts on an increase in the pressure of the fluid in a first chamber, a second pressure operated device also operative to establish driving connection between said input and output shafts on an increase in the pressure of the fluid in a second chamber, a valve element controlling the supply of fluid under pressure to and the release of fluid under pressure from said first and second chambers, said valve element having a normal position in which it releases fluid under pressure from said first and second chambers, said valve element being movable from said normal position in one direction a first amount to a first position in which it supplies fluid under pressure to said first chamber and releases fluid under pressure from said second chamber, said valve element also being movable from said normal position in said one direction through said first position to a second position in which it releases fluid under pressure from said first chamber and supplies fluid under pressure to said second chamber, biasing means yieldingly urging said valve element to said second position, a piston subject to the pressure of the fluid in a control chamber for moving said valve element against said biasing means, means for supplying fluid under pressure to said control chamber at a restricted rate, a first control passage opening through a wall of said control chamber at a point such as to be closed on movement of said valve element and piston beyond said first position towards said second position, a second control passage opening through a wall of said control chamber at a point such as to remain open at least until said valve element and said piston have been moved to said second position, and manually controlled means for at times releasing fluid under pressure from said control chamber through said first control passage and for at other times releasing fluid under pressure from said control chamber through said second control passage.

19. In combination, an input shaft adapted to be driven by an engine, an output shaft from which power may be transmitted to a load, a first pressure operated device operative on an increase in the pressure of the fluid in a first chamber to establish driving connection between said input and output shafts through gears providing a selected speed reduction, a second pressure operated device operative on an increase in the pressure of the fluid in a second chamber to establish driving connection between said input and output shafts through means providing a smaller speed reduction than that provided by the driving connection governed by said first clutch, a valve element controlling the supply of fluid under pressure to and the release of fluid under pressure from said first and second chambers, said valve element having a normal position in which it releases fluid under pressure from said first and second chambers, said valve element being movable from said normal position in one direction a first amount to a first position in which it supplies fluid under pressure to said first chamber and releases fluid under pressure from said second chamber, said valve element also being movable from said second position in said one direction through said first position to a second position in which it releases fluid under pressure from said first chamber and supplies fluid under pressure to said second chamber, biasing means yieldingly urging said valve element to said second position, a piston subject to the pressure of the fluid in a control chamber for moving said valve element against said biasing means, means for supplying fluid under pressure to said control chamber at a restricted rate, a first control passage opening through a wall of said control chamber at a point such as to be closed on movement of said valve element and piston beyond said first position towards said second position, a second control passage opening through a wall of said control chamber at a point such as to remain open at least until said valve element and said piston have been moved to said second position, manually controlled means for at times releasing fluid under pressure from said control chamber through said first control passage and for at other times releasing fluid under pressure from said control chamber through said second control passage, and means responsive to the rate of rotation of said output shaft for also releasing fluid under pressure from said control chamber through said second control passage.

20. In a transmission for a self-propelled vehicle having an engine governed by a throttle member movable from a closed to an open position for increasing the rate to which fuel is supplied to said engine, a shaft from which power may be transmitted to means for driving said vehicle, a hydraulic torque converter having a driving element driven by said engine and a driven element connected to said shaft, a lock-up clutch effective when engaged to couple said engine to said shaft independent of said torque converter, first means responsive to rotation of said torque converter driven element at a predetermined proportion of the speed of said torque converter driving element for effecting engagement of said lock-up clutch, second means effective when said throttle member is adjacent its open position for effecting release of said lock-up clutch, and a valve device responsive to engine speed for also controlling actuation of said lock-up clutch, said valve being biased to a first position in which said first means is adapted to engage said clutch, said valve being movable to a second position in response to engine speed to effect release of said lock-up clutch.

21. In a transmission for a self-propelled vehicle having an engine governed by a throttle member movable from a closed to an open position for increasing the rate at which fuel is supplied to said engine, a shaft from which power may be transmitted to means for driving said vehicle, a hydraulic torque converter having a driving element driven by said engine and a driven element connected to said shaft, a lock-up clutch effective when engaged to couple said engine to said shaft independent of said torque converter, control means responsive to the speed of said engine, a first valve device responsive to rotation of said torque converter driven element at a predetermined proportion of the speed of said torque converter driving element for effecting engagement of said lock-up clutch, and a second valve device responsive to engine speed for also controlling actuation of said lock-up clutch, said second device being biased to a first position in which said first valve device is adapted to engage said clutch, said second valve device being movable to a second position in response to engine speed to effect release of said lock-up clutch.

22. In combination, an engine governed by a throttle member movable from a closed to an open position for increasing the rate at which fuel is supplied to said engine, a hydraulic torque converter having a driving element driven by said engine and a driven element connected to a shaft from which power may be transmitted, control means effective when actuated to move said throttle member from the open position towards the closed position, and a control device responsive to the rates of rotation of said torque converter driving and driven elements, said control device being effective when and only when said torque converter driving element is rotating at a rate faster than the rate at which said driven element is rotating to actuate said control means.

References Cited in the file of this patent

UNITED STATES PATENTS

| | | |
|---|---|---|
| 2,302,714 | Pollard | Nov. 24, 1942 |
| 2,327,214 | Pollard | Aug. 17, 1943 |
| 2,372,817 | Dodge | Apr. 3, 1945 |
| 2,373,453 | Brunken | Apr. 10, 1945 |
| 2,380,677 | Schjolin | July 31, 1945 |
| 2,404,657 | Roberts et al. | July 23, 1946 |
| 2,449,608 | Le May, Jr. | Sept. 21, 1948 |
| 2,454,614 | Peterson et al. | Nov. 23, 1948 |